US008655300B2

(12) United States Patent
Kapoor et al.

(10) Patent No.: US 8,655,300 B2
(45) Date of Patent: Feb. 18, 2014

(54) DETECTING INTERFERENCE IN WIRELESS RECEIVER

(75) Inventors: Ajay Kapoor, Wijchen (NL); Maurice Stassen, Eindhoven (NL)

(73) Assignee: ST-Ericsson SA, Plan-les-Ouates (CH)

( * ) Notice: Subject to any disclaimer, the term of this patent is extended or adjusted under 35 U.S.C. 154(b) by 0 days.

(21) Appl. No.: 13/700,608

(22) PCT Filed: May 23, 2011

(86) PCT No.: PCT/EP2011/058377
§ 371 (c)(1),
(2), (4) Date: Nov. 28, 2012

(87) PCT Pub. No.: WO2011/151216
PCT Pub. Date: Dec. 8, 2011

(65) Prior Publication Data
US 2013/0084821 A1 Apr. 4, 2013

Related U.S. Application Data

(60) Provisional application No. 61/367,937, filed on Jul. 27, 2010.

(30) Foreign Application Priority Data

May 31, 2010 (EP) ..................................... 10164421

(51) Int. Cl.
*H04B 1/10* (2006.01)
*H04B 15/00* (2006.01)
(52) U.S. Cl.
USPC ........ 455/307; 455/63.1; 455/67.13; 375/350

(58) Field of Classification Search
USPC ............. 455/63.1, 67.13, 295, 296, 307, 334, 455/339; 375/346, 350
See application file for complete search history.

(56) References Cited

U.S. PATENT DOCUMENTS

| 4,812,851 | A  | * | 3/1989 | Giubardo ...................... 455/307 |
| 6,710,677 | B2 | * | 3/2004 | Beaudin et al. ............... 333/133 |
| 7,346,134 | B2 | * | 3/2008 | Smith ........................... 375/346 |
| 7,885,355 | B2 | * | 2/2011 | Perraud et al. ................ 375/316 |
| 2009/0097601 | A1 | | 4/2009 | Perraud et al. |

FOREIGN PATENT DOCUMENTS

| WO | 0219546 A2 | 3/2002 |
| WO | 2005076483 A1 | 8/2005 |

* cited by examiner

Primary Examiner — Quochien B Vuong
(74) Attorney, Agent, or Firm — Coats & Bennett, P.L.L.C.

(57) ABSTRACT

A wireless receiver (110) for UWB or other format, receives a useful signal in a particular band of frequencies in site spite of interference components inside and outside the particular band of frequencies. An interference detector (130, 535, 555) detects the in band interference component in a first range of frequencies to include the particular band of frequencies. The same receiver circuitry (120, 300, 310, 505) is adapted to receive a second range of frequencies to include frequencies adjacent to the particular band, to detect the out of band interference component. The position of a second interfering signal in the second range is used to detect artifacts caused by spectral folding so that the required frequency of a band reject filter can be found.

13 Claims, 12 Drawing Sheets

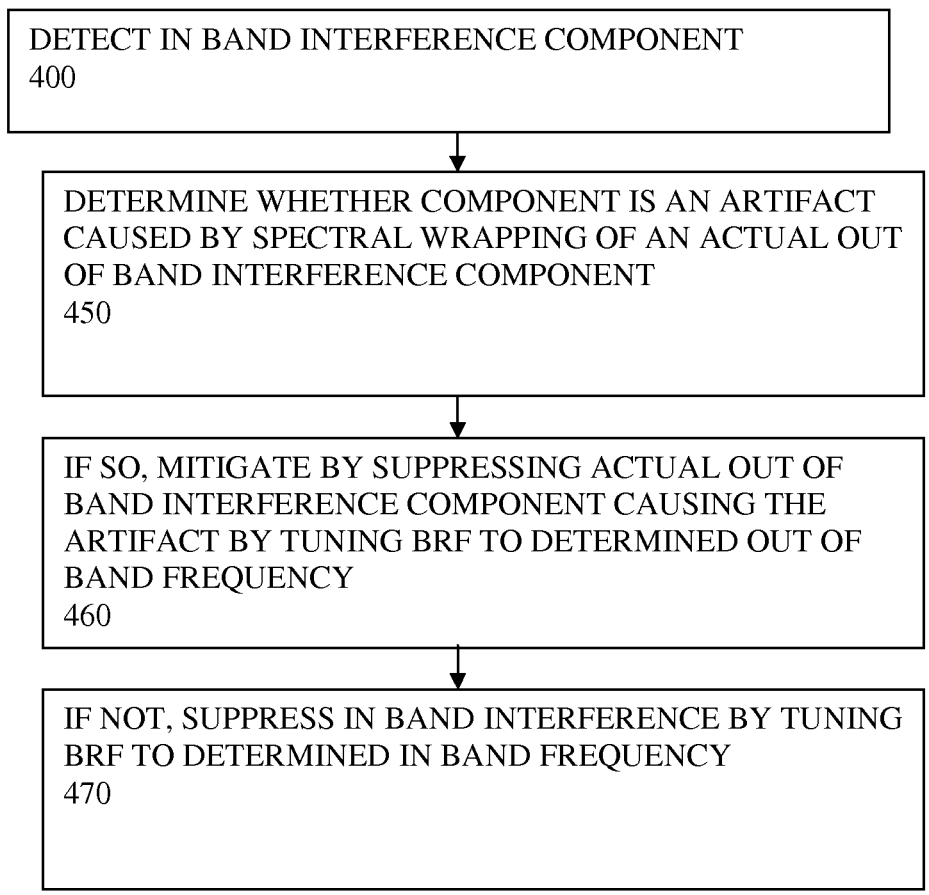

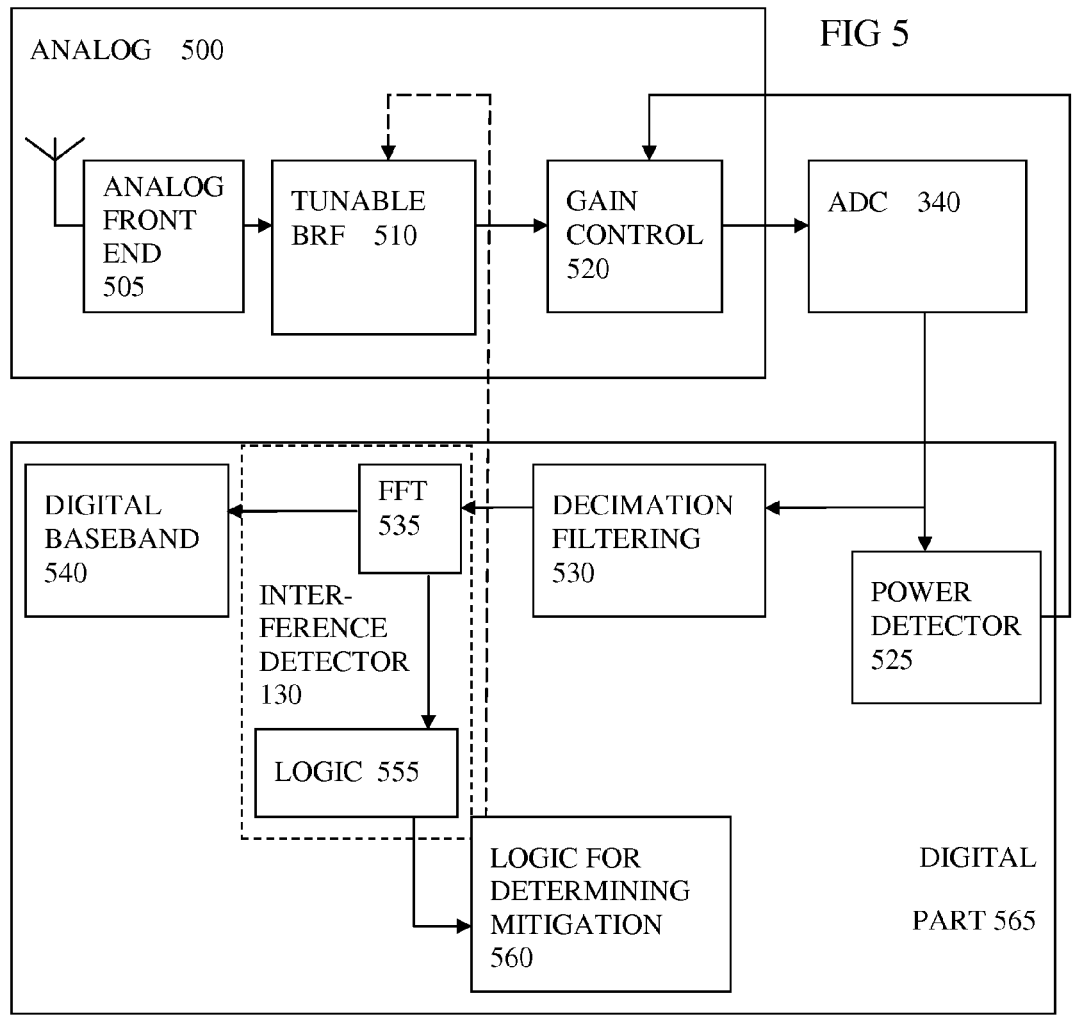

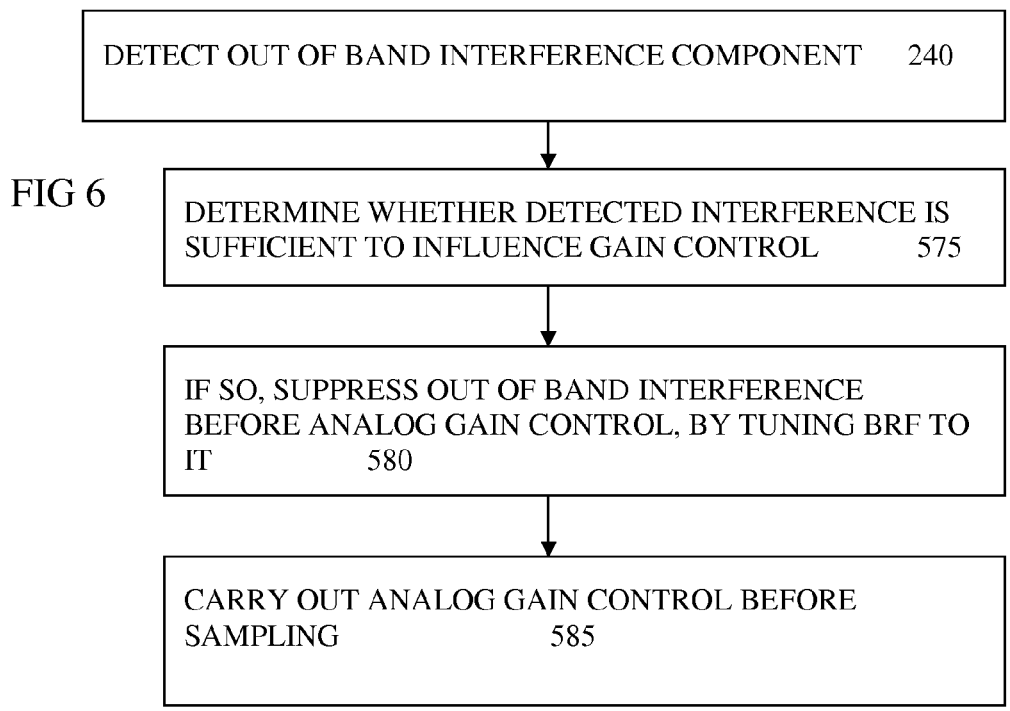
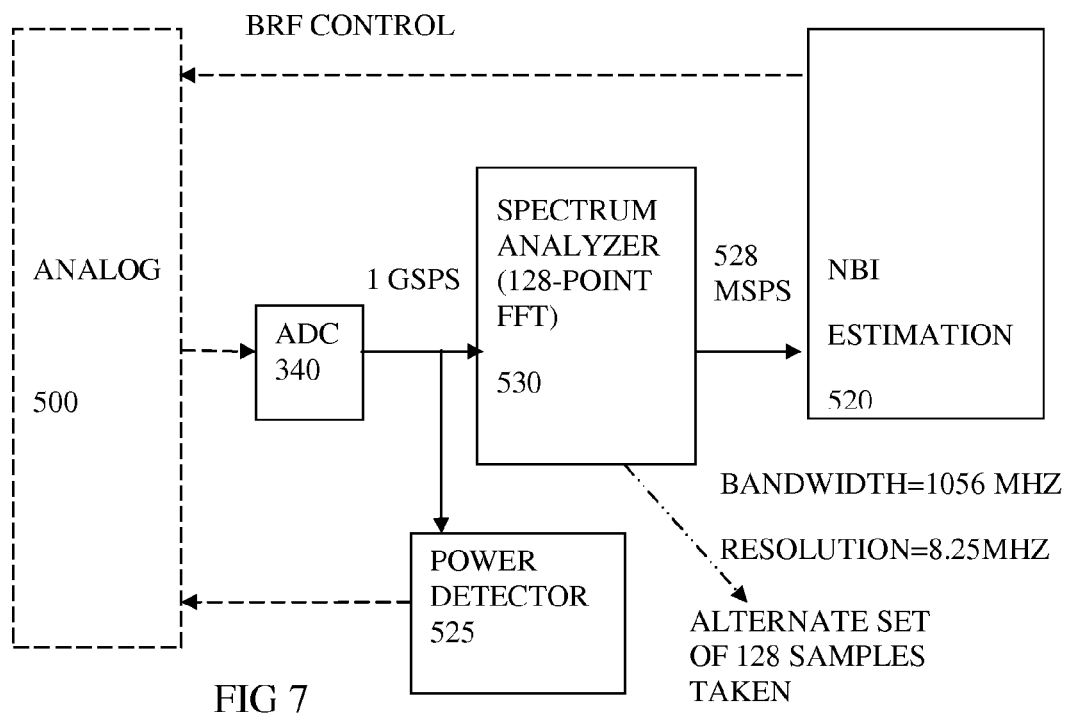

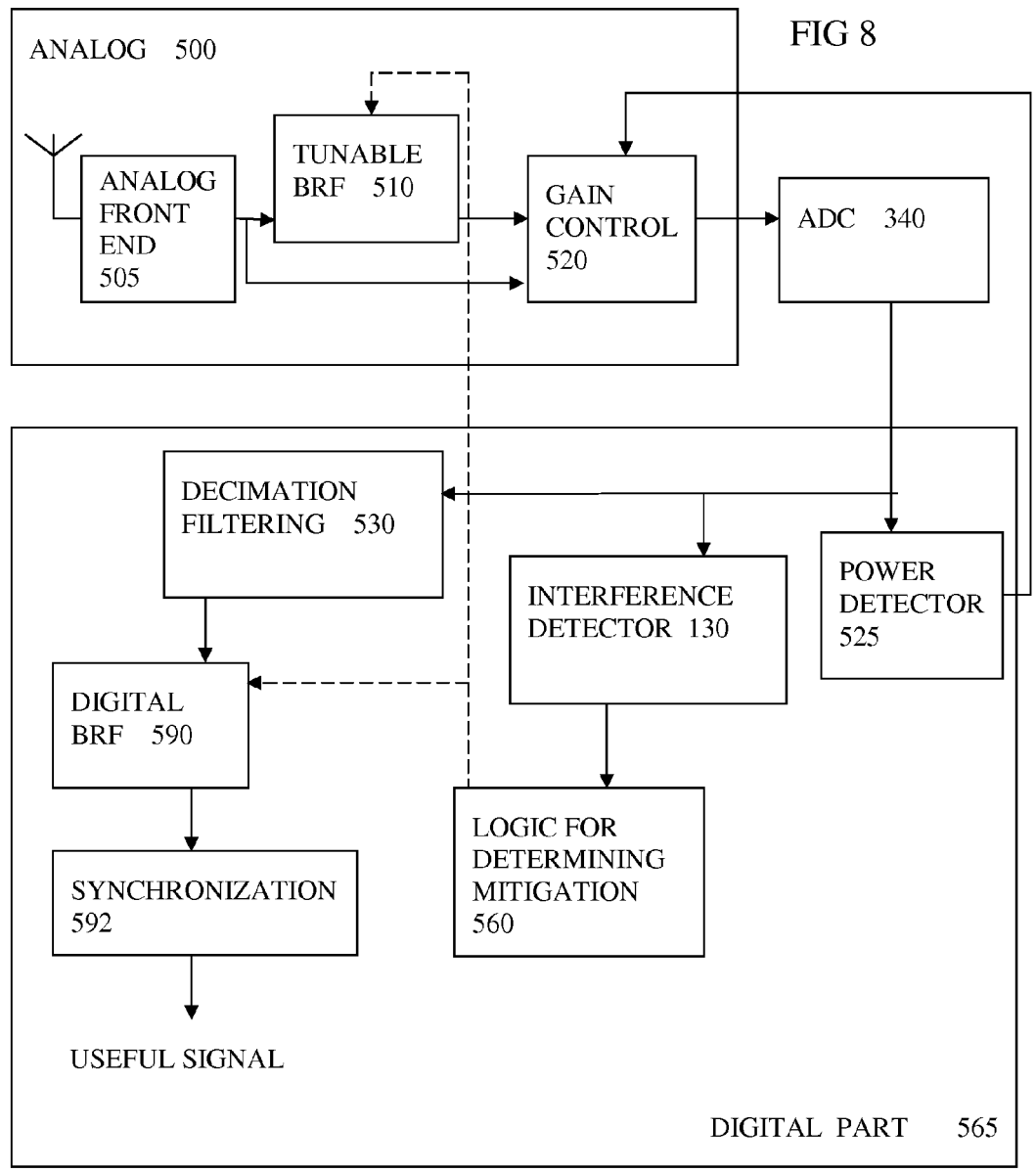

DETECTING INTERFERENCE IN WIRELESS RECEIVER

FIELD OF THE INVENTION

This invention relates to methods of operating a wireless receiver to receive a useful signal in a particular band of frequencies in spite of interference components inside and outside the particular band of frequencies. It also relates to corresponding wireless receivers, and to equipment incorporating such wireless receivers such as transceivers and to wireless systems.

DESCRIPTION OF THE RELATED ART

It is known that operation of wireless receivers for various frequency bands can be affected by interference components of different types, narrow band or broad band. For example the operation of a wideband system like WiMedia based UWB (Ultra Wide Band) receiver systems can get corrupted by the presence of harmonics from nearby narrowband devices. Due to the wideband nature of UWB system, these harmonics may co-occupy the frequency band with UWB systems. It is proposed that systems like UWB systems estimate these in-band narrowband interferences (NBI) and suppress the spectrum where there is likelihood of these interferences. NBI estimation is done using spectral analysis of the input signal in the digital baseband. This step allows for the estimation of the interferences which are in the frequency band of the UWB devices. It is known from WO2009114123A2 to have a wideband signal processing apparatus for software defined radio that can include a transceiver configured to receive a UWB signal via an antenna. A spectrum analyzer provides a characterization of the UWB signal, which may be used to set a reconfigurable band-reject filter (BRF) to null detected interferers. Changing a gain of the band-reject filter adjusts a centre frequency of the band-reject filter.

SUMMARY OF THE INVENTION

An object of the invention is to provide methods of operating a wireless receiver to receive a useful signal in a particular band of frequencies in spite of interference components inside and outside the particular band of frequencies. It also provides corresponding wireless receivers, and equipment incorporating such wireless receivers such as transceivers and wireless systems.

According to a first aspect, the invention provides:

A method of operating a wireless receiver to receive a wanted signal, the method comprising the steps of:

receiving a first signal comprising the wanted signal and any unwanted signals; downconverting said first signal to a first analog baseband signal using a first oscillator frequency;

band pass filtering said first analog baseband signal to obtain a filtered first analog baseband signal;

converting said filtered first analog baseband signal to a first digital baseband signal which is a band representing a frequency range of the wanted signal; identifying the position of any first interfering signal in said first filtered digital baseband signal;

downconverting said first signal to a second analog baseband signal using a second oscillator frequency;

band pass filtering said second analog baseband signal to obtain a filtered second analog baseband signal;

converting said filtered second baseband signal to a second digital baseband signal, optionally of the same width as the first digital baseband signal, and representing a frequency range directly above or below that of the wanted signal;

identifying the position of any second interfering signal in said second digital baseband signal;

comparing the identified first and second interfering signals;

determining the required frequency of a band reject filter based on the comparing step;

filtering the first analog baseband signal using the band reject filter at the determined frequency and;

obtaining the wanted signal from the first filtered digital baseband signal.

Notably by detecting out of band interference, its influence can be mitigated and so reception of the useful signal can be improved. In particular by adapting the same receiver circuitry to receive the second range of frequencies, adjacent to the particular band, different frequency ranges, there is less need to broaden the bandwidth of the receiver circuitry, or to duplicate it, to be able to detect the out of band interference. Thus the receiver circuitry can be kept simpler and costs or power consumption can be reduced for a given level of performance. By comparing interferers in the different frequency ranges, artifacts caused by spectral folding from other frequencies can be detected and the filtering tuned to the frequency causing the artifact.

Embodiments of the invention can have any other features added, and some such additional features are set out in dependent claims and described in more detail below.

Another aspect provides:

A wireless receiver comprising:

an input for receiving a wanted analog signal;

a mixer for downconverting the analog signal to a first and second analog baseband signal using a tunable oscillator set at first and second frequencies; a band pass filter for selecting a respective band of frequencies from the first and second analog baseband signals, the first band representing a frequency range of the wanted signal and the second band representing a frequency range directly below or above that of the first band; an analog to digital converter to convert the first and second analog baseband signals to first and second digital baseband signal comprising bands representing the corresponding bands of frequencies, an interference detector, and characterized by an analog band reject filter, a processor adapted to identify and compare any interfering signals in the first and second digital baseband signals and control the frequency of the band reject filter in dependence on the comparison of the interfering signals.

Any of the additional features can be combined together and combined with any of the aspects. Other advantages will be apparent to those skilled in the art, especially over other prior art. Numerous variations and modifications can be made without departing from the claims of the present invention. Therefore, it should be clearly understood that the form of the present invention is illustrative only and is not intended to limit the scope of the present invention.

BRIEF DESCRIPTION OF THE DRAWINGS

How the present invention may be put into effect will now be described by way of example with reference to the appended drawings, in which:

FIG. 4 shows steps in operating a wireless receiver according to an embodiment, showing mitigating by tuning a BRF to suppress a cause of the artifact.

FIG. 5 shows a schematic view of a wireless receiver according to an embodiment having analog parts such as BRF and gain control, and having digital parts such as a FFT and logic for detecting interference and determining mitigation, FIG. 6 shows steps in operating a wireless receiver according to an embodiment, showing mitigating to improve gain control, FIG. 7 shows a schematic view of receiver circuitry including analog and digital parts for a wireless receiver according to an embodiment, showing an FFT and NBI estimation parts, FIG. 8 shows a schematic view of a wireless receiver according to another embodiment having analog parts such as BRF and gain control, and having digital parts such as digital BRF and synchronization.

DESCRIPTION OF THE PREFERRED EMBODIMENTS

Figure 1:
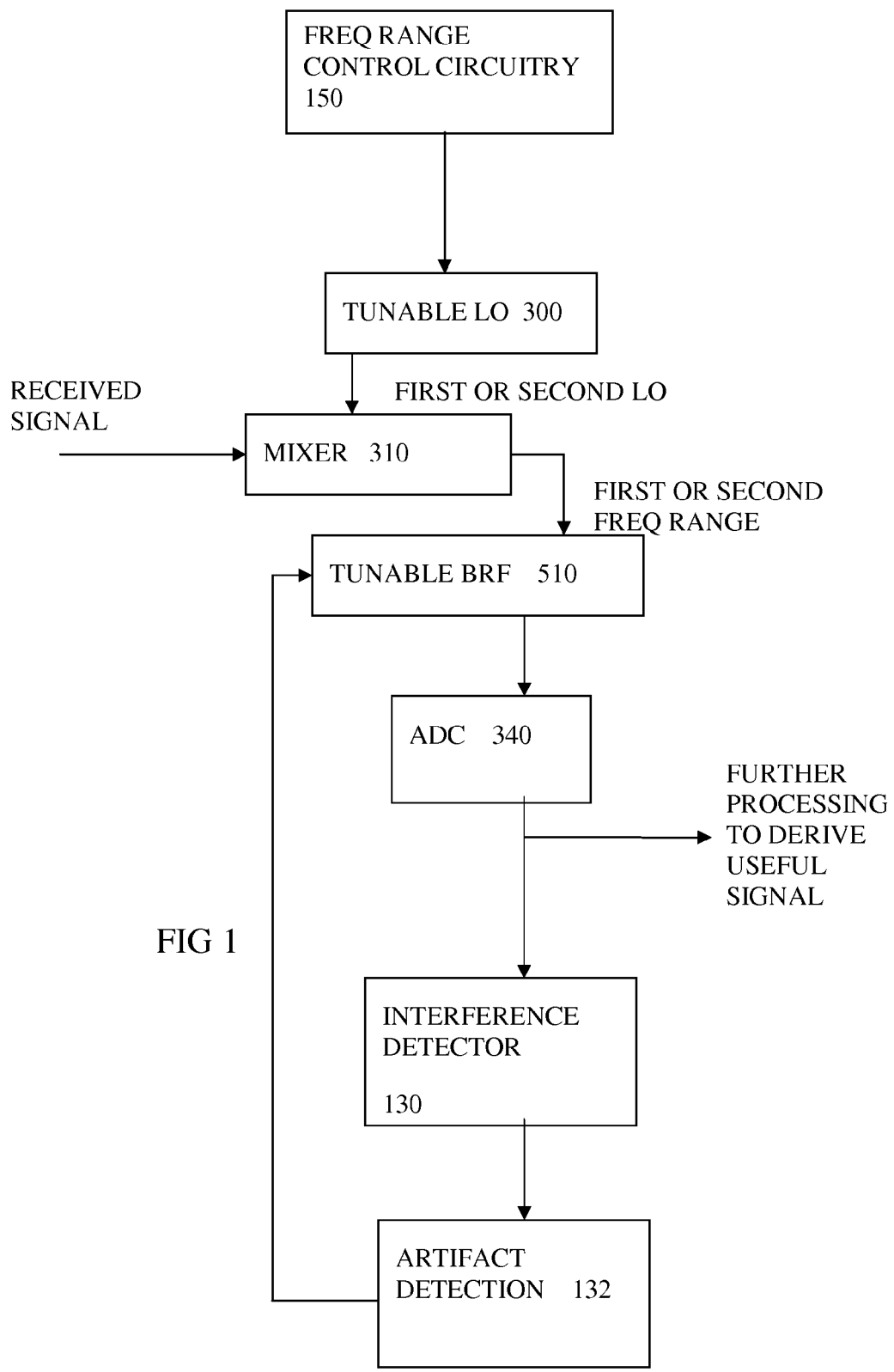
FIG. 1 shows a schematic view of a wireless receiver according to an embodiment.

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes.

Where the term "comprising" is used in the present description and claims, it does not exclude other elements or steps. Where an indefinite or definite article is used when referring to a singular noun e.g. "a" or "an", "the", this includes a plural of that noun unless something else is specifically stated.

The term "comprising", used in the claims, should not be interpreted as being restricted to the means listed thereafter; it does not exclude other elements or steps. Elements or parts of the described receivers may comprise logic encoded in media for performing any kind of information processing. Logic may comprise software encoded in a disk or other computer-readable medium and/or instructions encoded in an application specific integrated circuit (ASIC), field programmable gate array (FPGA), or other processor or hardware.

References to software can encompass any type of programs in any language executable directly or indirectly by a processor.

References to logic, hardware, processor or circuitry can encompass any kind of logic or analog circuitry, integrated to any degree, and not limited to general purpose processors, digital signal processors, ASICs, FPGAs, discrete components or transistor logic gates and so on.

References to interference components can encompass any type of interference, narrow band or broadband, continuing or intermittent, or to any part of the interference.

References to receiving are intended to encompass down-shifting frequencies to baseband, or distinguishing a band of frequencies, according to the context.

References to ambiguity region refer to a region where interferers can appear due to spectral folding. These interferers are potentially not actually present in the received signal but caused by spectral folding of interferers at a different frequency from sampling either at the ADC or the decimation filter for example. In theory such spectral folding should be removed by anti aliasing filters, but in practice it is not practical to provide sufficiently steep sided filters. The size of this region depends on the order of the used anti-aliasing or decimation filter and the maximum expected interference level. The higher the filter order, the smaller the ambiguity region will be. The higher the maximum interference power, the larger the ambiguity region will be. Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

Moreover, the terms top, bottom, over, under and the like in the description and the claims are used for descriptive purposes and not necessarily for describing relative positions. It is to be understood that the terms so used are interchangeable under appropriate circumstances and that the embodiments of the invention described herein are capable of operation in other orientations than described or illustrated herein.

FCC and ITU-R define Ultra Wide Band as "a transmission from an antenna for which the emitted signal bandwidth exceeds the lesser of 500 MHz or 20% of the center frequency".

Reference throughout this specification to "one embodiment" or "an embodiment" means that a particular feature, structure or characteristic described in connection with the embodiment is included in at least one embodiment of the present invention. Thus, appearances of the phrases "in one embodiment" or "in an embodiment" in various places throughout this specification are not necessarily all referring to the same embodiment, but may do. Furthermore, the particular features, structures or characteristics may be combined in any suitable manner, as would be apparent to one of ordinary skill in the art from this disclosure, in one or more embodiments.

Similarly it should be appreciated that in the description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the detailed description are hereby expressly incorporated into this detailed description, with each claim standing on its own as a separate embodiment of this invention.

Furthermore, while some embodiments described herein include some but not other features included in other embodiments, combinations of features of different embodiments are meant to be within the scope of the invention, and form different embodiments, as would be understood by those in the art. For example, in the following claims, any of the claimed embodiments can be used in any combination.

In the description provided herein, numerous specific details are set forth. However, it is understood that embodiments of the invention may be practiced without these specific details. In other instances, well-known methods, structures and techniques have not been shown in detail in order not to obscure an understanding of this description.

The invention will now be described by a detailed description of several embodiments of the invention. It is clear that other embodiments of the invention can be configured according to the knowledge of persons skilled in the art without departing from the technical teaching of the invention, the invention being limited only by the terms of the appended claims.

Introduction to Some Issues Addressed by the Embodiments

It has now been appreciated that wireless receivers including those for wideband systems like UWB systems can also suffer due to just-out-of band interference components. These interferences can not be detected by normal procedure and can create as much problems as normal in-band interferences. Embodiments to be described involve detecting just-out of band interferences in addition to normal in band interferences. They can be applied in for example Narrowband interference (NBI) mitigation, OFDM, Wimedia based UWB, Wireless USB, media-access-control (MAC), Cognitive radio, and so on. The output of the detection can be used to tune a BRF such as a notch filter, to cancel the affect of the NBI. Alternatively or as well, the output of this detection mechanism can also be used for mitigation in other ways, such as by optimization of communication resources like data rate, carrier frequency etc at the transmitter side. The FCC and ITU-R define UWB in terms of a transmission from an antenna for which the emitted signal bandwidth exceeds the lesser of 500 MHz or 20% of the centre frequency. Thus, pulse-based systems—wherein each transmitted pulse instantaneously occupies the UWB bandwidth, or an aggregation of at least 500 MHz worth of narrow band carriers, for example in orthogonal frequency-division multiplexing (OFDM) fashion—can gain access to the UWB spectrum. Unlicensed use of UWB can be in the range of 3.1 to 10.6 GHz. The useful signal information can be modulated on UWB pulses by encoding the polarity of the pulse, the amplitude of the pulse, and/or by using orthogonal pulses. UWB pulses can be sent sporadically at relatively low pulse rates to support time/position modulation, but can also be sent at rates up to the inverse of the UWB pulse bandwidth. UWB systems tend to be short-range and indoors applications. However, due to the short duration of the UWB pulses, it is easier to engineer extremely high data rates, and data rate can be readily traded for range by simply aggregating pulse energy per data bit using either simple integration or by coding techniques. Conventional OFDM (Orthogonal Frequency Division Multiplexing) technology can also be used.

How a wideband system like WiMedia-based UWB can get interference from narrowband devices which operate in its close proximity will now be discussed. These narrowband interferences can co-occupy the frequency spectrum with a UWB system. The effect of such problems on UWB receiver and possible solutions are known and more details can be obtained from Kelleci, B.; Fischer, T. W.; Shi, K.; Yi Zhou; Karsilayan, A. I.; Serpedin, E.; "Narrowband Interference Suppression in Multi-Band OFDM Ultra Wideband Communication Systems: A Mixed-Mode Approach", (Digital Signal Processing Workshop, 12th-Signal Processing Education Workshop, 4$^{th}$, Issue Date: 24-27 Sep. 2006 page(s): 55-59, Teton National Park, Wyo., ISBN: 1-4244-3534-3).

The known solutions adopt a two step approach and involve the suppression of the unwanted interferences by using notch filters. A first step deals with interference estimation for tuning of notch filters and a second step involves suppressing the interference using notch filters. As will be explained in next section, these solutions can combat the interferences which are strictly in the band of UWB system. But, there can also be interferences which are out of frequency band of UWB system. If these interferences are beyond the stop band of analog anti-aliasing filter then analog filter will suppress these out-of-band signals and hence, prevent them entering into digital. However, these analog filters generally have a pass band, a transition band and a stop band. They do not have enough suppression for a just out-of-band signal which will fall in the transition band. As a consequence, interferers which are just out-of-band of the UWB system will still enter into digital baseband after the analog to digital conversion (ADC) without much attenuation. These just-out-of-band signals could be suppressed by decimation filters in the digital baseband. Depending on the strength of just-out-of-band NBI with respect to the suppression offered by decimation filtering, following two cases may occur:

1) If the strength of NBI is less than the suppression provided by the decimation filter then the decimation filter suppresses the NBI completely and NBI estimation will not detect any NBI.

2) If the just out-of-band signals are very strong, then downsampling/decimation will not be able to suppress them completely. So, if the spectral analysis of such an input signal is performed, the NBI signal which was initially just out of band will appear as an artifact at a different frequency, in the band, due to folding of the spectrum caused by the digital processing. Consequently, the spectrum analyzer will conclude that NBI is located at wrong frequency location.

In both of the above cases, the tunable analog BRF will not be tuned properly and hence, NBI will not be suppressed. It is important to note that for case 1) the power detector (just after the ADC) will get the power in the whole spectrum of ADC. Therefore, it will see higher power due to the presence of NBI signal and tune the AGC such that power level of incoming stream is reduced. Therefore, useful in-band UWB signal will also get attenuated. This will reduce the overall SNR of the useful signal. This can lead to the following:

1) Incorrect tuning of BRFs and hence suppression of useful spectrum by BRFs.

2) No suppression of interference and hence, an increase in the quantization noise of desired UWB signal and other associated problems.

Apart from the above, the interferers which are on one edge of UWB band may partially appear on the other edge of the band. This can occur due to the spectral leakage between the FFT bins and the spectral folding on the edge of the band. Spectral leakage can cause the interferer to appear on the neighbouring FFT bins. For the edge of UWB frequencies, neighbouring FFT bins are on the other edge. So, an interferer which is on the positive edge of frequency band can appear partly at the negative edge as well. For the same reasons, interferers on the negative edge can appear partly at the positive edge. So, there can be uncertainty, about the exact frequency to be suppressed for such interferers.

Illustration: The above problems and their effects can also be understood from the following discussion of a more detailed example.

Wrong Dynamic Range by the Gain Control Part

The UWB spectrum is taken to be 528 MHz wide. Therefore, digital baseband is working on −264 to 264 MHz (or 0 to 528 MHz) wide spectrum. However, the ADC samples at higher rate (and in some cases two ADCs running at 528 MHz can be used for I and Q components for example). The ADC is normally followed by a decimation filter. If this oversampling by the ADC is not done, the transition band of the analog filter would have to be very narrow (tens of MHz) which is impractical. With the suggested oversampling, the transition band of analog filter will be from 264 MHz to 792 MHz (approximately). This simplifies the design requirements of the analog filter.

In this case, the incoming digital samples from the ADC will have a span of 1 GHz bandwidth (−528 to +528 MHz). Higher frequency parts (>264 MHz or <−264 MHz) of this signal will fall into the transition band of the analog filter and will get suppressed weakly by the analog filter before reaching the ADC. However, the analog filter does not provide much suppression on frequencies which are just out of band (e.g., ~300 MHz). Therefore, these frequency parts will reach the ADC without much attenuation. Gain control at this point will also see this interference, and the dynamic range will be set according to the maximum power seen. The out of band interferer at this point may be much larger than the useful signal. This dynamic range, controlled by the gain control may be much larger than necessary. In turn this can lead to excessively coarse quantization in the sampling by the ADC, meaning the useful signal is deteriorated or lost, and interference can be spread over neighboring FFT bins etc.

Wrong Suppression Frequency Caused by Spectral Folding

Moreover, an additional problem may occur which is caused by spectral folding of frequency spectrum due to downsampling (decimation) in the digital domain. Due to spectral folding, the signals at higher frequency than the Nyquist frequency will appear at the negative frequency and vice versa. If the anti-aliasing filter does not have sufficient suppression to suppress the just-out-of-band interference, then this problem will arise. In this case, the analog BRF will be tuned to incorrect frequency. Consequently, the interferer signal is not suppressed and the signal spectrum which was not corrupted by narrowband interference will be suppressed, thereby reducing the signal to noise ratio of UWB signal.

In Band Interference Suppression

To overcome the problems due to in-band narrowband interferences, it is known to suppress the unwanted interferences by using BRFs. This approach uses FFT as a rough spectrometer to analyze the spectrum of incoming signal for interference detection. The input sampling rate of FFT blocks is corresponding to the bandwidth of the system. The ADC uses a higher sampling rate to ease the requirements of analog baseband filtering and is generally followed by a downsampler so that the rest of digital baseband functions at a lower sampling rate. Therefore, the sampling rate at an FFT block is lower than the sampling rate of the ADC. By using this approach, the FFT performs the spectrum analysis on the frequency band corresponding to bandwidth of the UWB signal (528 MHz). Therefore, the current solutions have a search space which is strictly limited to the in-band interferences. The ADC output is first downsampled before further baseband processing. A power detector is placed just after the ADC, and measures the power of incoming samples. This measurement is used as an input to a gain control part (AGC). This ensures that the analog input signal fits into the maximum signal range supported by the ADC and hence, does not suffer from clipping at ADC.

Such current solutions do not take into account the problems due to just-out-of-band interferers.

Introduction to Some Features of the Embodiments

Two new modifications will be introduced here and explained in more detail below. Firstly, the detection of interferers is carried out by a spectrum analysis of incoming signal multiple times over different frequency ranges using the same receiver circuitry. This can be implemented in various ways, one way is to shift the frequency of a oscillator input to a mixer in the receiver circuitry. This can be a shift by 528 MHz or other value. Then the spectral analysis can be carried out as before in a digital signal processing part for interference detection. In the example explained earlier, the stopband of the analog filter starts at 792 MHz. If there are very strong interferers around 528 MHz which cause the artifacts by spectral folding, the ambiguity of which frequency to suppress can be addressed by combining the observations from the different frequency ranges. By noting that the edge interferers measured in one frequency range may fall into the middle part of spectrum in other measurements. So, any ambiguity in exact location of interferer can be resolved.

A second modification is to move the spectrum analyzer to a higher speed data domain, so that spectrum analysis can now be done for a −528 to +528 MHz range. If it is desirable to keep the speed of operation the same for subsequent parts, the spectral analysis can be done for alternate sets of 128 samples, and other sets can be discarded. The second modification can help in correct control of the AGC and in finding the interferers which are very close to the Nyquist frequency of the system (±264 MHz).

Some embodiments have following advantages compared to previous work: Just out-of-band interference mitigation, less or no incorrect BRF tuning of interferers which are on the outer limit of frequency band, and improved SNR for UWB signals in presence of 'just-out-of-band' interferers by better AGC tuning.

FIG. 1, Schematic View of a Wireless Receiver According to an Embodiment,

In FIG. 1, a wireless receiver can receive transmissions from a transmitter. The receiver has receiver circuitry, to derive a useful signal in a particular band of frequencies in spite of interference components inside and outside the particular band of frequencies. An interference detector 130 is provided which can detect in band interference if fed a first frequency range from the receiver circuitry to include at least some of the particular band of frequencies from the received signal. It can detect out of band interference if fed a second range of frequencies by the receiver circuitry to include frequencies adjacent to the particular band. A frequency range control part 150 can adapt the receiver circuitry to receive, at a different time period, before or after the receiving in the first range, the second range of frequencies.

A tunable oscillator LO 300 feeds an LO signal to a mixer 310, for mixing the received signal and shifting its frequency. The frequency control range sets which frequency the oscillator outputs. There can be two or more frequencies. The output of the mixer can be the first or second range of frequencies for example, or other ranges of frequencies, at different time intervals. An interference detector 130 can operate on this output and in the different time intervals, can detect the in band interference and the out of band interference. Optionally these outputs can be processed before reaching the interference detector, for example by filtering and so on.

The detected interference is used by an artifact detection part 132, to determine whether an interferer is actually present in the received signal, or is merely an artifact caused by spectral folding of an out of band interferer. The result of this detection is used to control the tunable BRF to suppress the actual interferer or the out of band interferer causing the artifact.

This is a form of mitigation for the influence of the out of band interference on the receiving of the useful signal, and any other kind of mitigation control signal can be fed back to the receiver circuitry. Some of these parts can be implemented in various ways, and examples will be described in more detail below. There can be many other parts not shown. There can be more than two frequency ranges.

Figure 2:
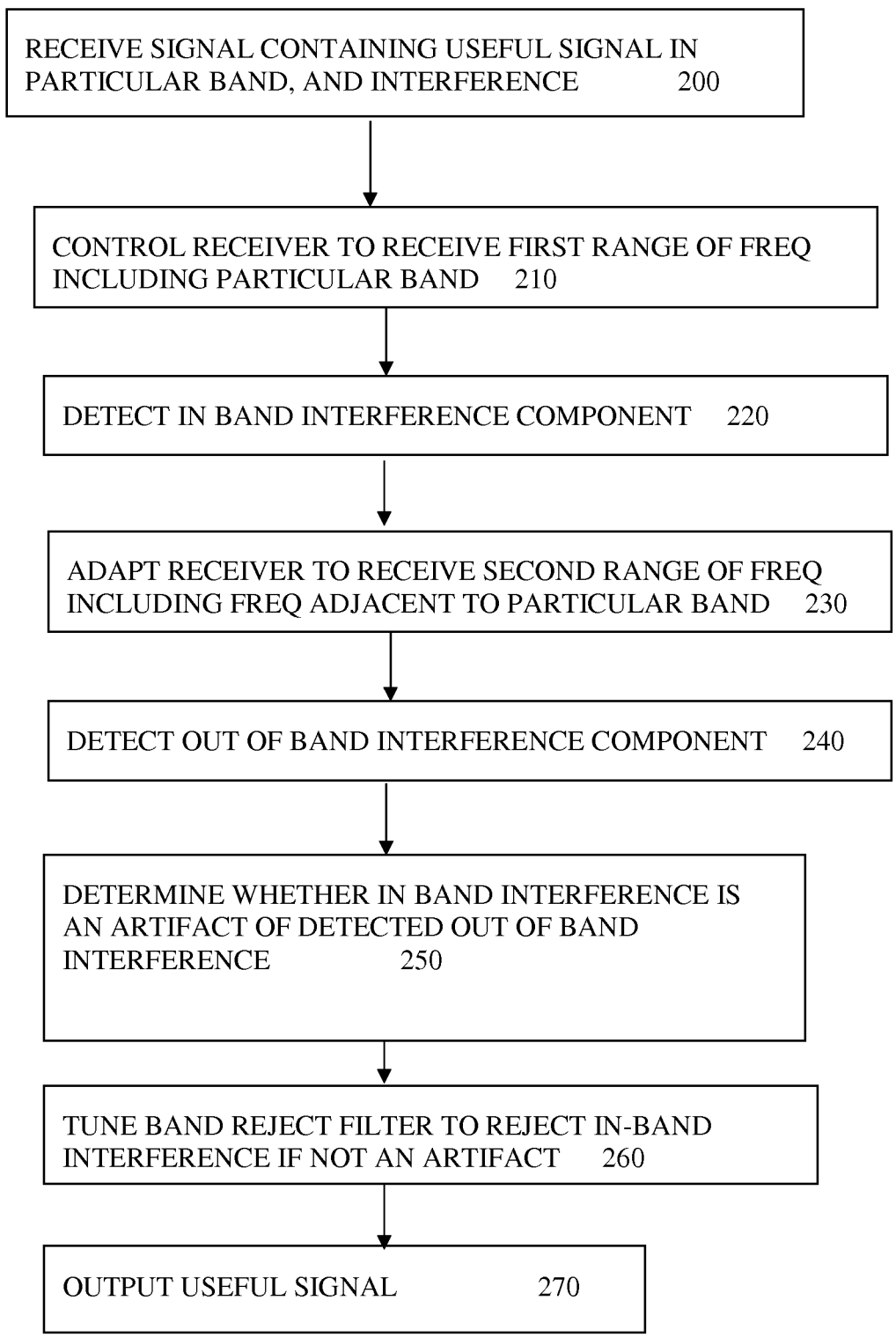
FIG. 2 shows steps in operating a wireless receiver according to an embodiment.

FIG. 2 Steps in Operating a Wireless Receiver According to an Embodiment

In FIG. 2, steps in operating a wireless receiver such as that of FIG. 1, or other embodiments are shown. At step 200, a signal is received, having the useful signal in a particular band. The receiver circuitry is controlled at step 210 to receive (meaning distinguishing) a first range of frequencies including the particular band. At step 220, the in band interference component is detected from the first range of frequencies. At step 230, the receiver circuitry is adapted to receive a second range of frequencies including frequencies adjacent to the particular band. Out of band interference is detected at step 240, from the second range of frequencies. At step 250, it is determined whether to mitigate the influence of the detected out of band interference on the receiving of the useful signal. Such mitigation can optionally be carried out at step 260, and the useful signal can be output at step 270.

Some Additional Features:

Some additional features are as follows:

The comparing step can comprise comparing the positions of the first and second interfering signals in their respective digital baseband signals and determining whether they occupy similar positions in their respective bands.

The method can involve, if it is determined that the interfering signals occupy similar positions in their respective bands, further determining whether the positions are in an ambiguity region close to the edge of the bands.

The method can involve, if it is determined that the interfering signals are in the ambiguity region, the step of determining the required frequency of a band reject filter comprises determining that the required frequency of the band reject filter should be that corresponding to the interferer found in the second digital baseband signal.

The method can involve, if it is determined that the interfering signals are not in the ambiguity region, the step of determining the required frequency of a band reject filter comprises determining that the required frequency of the band reject filter should be that corresponding to the interferer found in the first digital baseband signal.

The method can involve, if it is determined that the inferring signals do not occupy similar positions in their respective bands, the step of determining the required frequency of a band reject filter step comprises determining that the required frequency of the band reject filter should be that corresponding to the interferer found in the first digital baseband signal.

The determination of whether the detected in band interference is an artifact, can involve the steps of determining a frequency of a potential out of band interference component to cause the artifact, according to a sampling frequency of the digital part, searching for an out of band interferer at that frequency, and deducing whether the detected in band interference is an artifact according to a result of the search. This can enable such artifacts to be distinguished from real in band interference components, and hence can enable more effective suppression.

The method can have the step of controlling gain in the analog part, and the step of determining whether to mitigate can involve determining whether the detected out of band interference component is sufficient to influence the gain control. The detecting steps can involve the step of carrying out a spectral analysis in the digital part using a Fourier transform, to provide indications of power at different frequencies. This can be more cost effective than other methods such as filter banks in the analog or digital parts. Optionally the two detection steps can make use of a single Fourier transform covering both ranges of frequencies, or there can be two separate transforms carried out sequentially.

The method can involve receiving transmissions using a band hopping protocol. The particular band can be between −264 MHz and +264 MHz or greater. Such a width of band makes it harder to implement steep edged filters and sufficiently high sampling rates with restricted cost and power consumption requirements. This band is the bandwidth of a baseband UWB signal. This 528 MHz of bandwidth relates to an RF (center) frequency from 3.432 GHz to 10.296 GHz. It is the ratio between the RF frequency and baseband signal bandwidth (6.5 to 19.5) which makes it hard to implement steep edged filters.

The receiver can have circuitry for determining whether a detected in band interference component at a given frequency is an artifact caused by spectral wrapping of an actual out of band interference component caused by digital processing.

The receiver can in other words have circuitry for receiving a first range of frequencies to include at least some of the particular band of frequencies from the received signal, and an interference detector for detecting the in band interference component in the received first range. It can have control circuitry for adapting the same receiver circuitry to receive, at a different time period, before or after the detecting in the first range, a second range of frequencies to include frequencies adjacent to the particular band, the interference detector being arranged to detect the out of band interference component in the received second range. Circuitry can also be provided coupled to the interference detector for determining whether to mitigate an influence of the detected out of band interference component on the receiving of the useful signal.

Examples of some additional features are shown in the embodiments described below, and any of them can be added to any of the embodiments.

Figure 3:
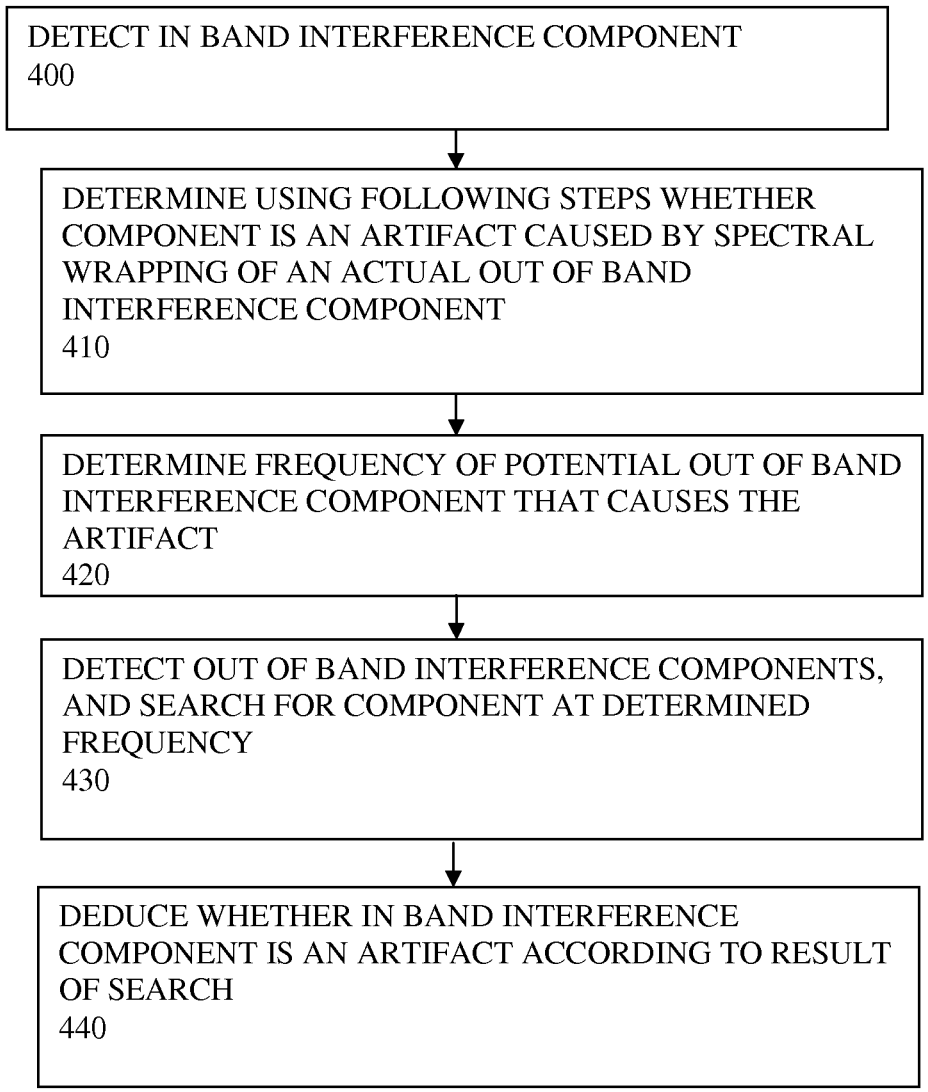
FIG. 3 shows steps in operating a wireless receiver according to an embodiment, showing determining whether a detected component is an artifact caused by spectral wrapping.

FIGS. 3 and 4, Steps in Operating a Wireless Receiver, Showing Determining Whether a Detected Interference Component is an Artifact In FIG. 3, steps in operating a wireless receiver such as that of FIG. 1, or other embodiments are shown. At step 400, in band interference is detected. Step 410 shows then determining whether the detected interference component is real or just an artifact of a real component at another frequency. This is done by the following steps. At step 420, a frequency of a potential cause of the artifact is calculated, based on the sampling frequency. At step 430 out of band interference components are detected and a search of these is made for any at the frequency which could cause the artifact after spectrum wrapping. At step 440, logic of any kind is used to deduce that the in band is not an artifact if there is no detection of an interference component at the frequency which could cause the artifact. If there is a detected interference component at this frequency, then it is deduced that it has caused the artifact and that the artifact is therefore not a real interference component. In this case suppression should be at the frequency causing the artifact, not at the frequency of the artifact.

FIG. 4 shows steps in operating a wireless receiver according to an embodiment, showing mitigating by tuning a BRF to suppress a cause of the artifact. At step 400, as before, in band interference is detected. Step 450 shows then determining whether the detected interference component is real or just an artifact of a real interference component at another frequency. If so, at step 460, the mitigation takes place, by tuning a BRF to suppress the frequency of the interference causing the artifact. Otherwise, at step 470, the mitigation takes place, by tuning a BRF to suppress the frequency of the interference detected in band and found not to be an artifact.

FIG. 5 Schematic View of a Wireless Receiver According to an Embodiment having Analog BRF and Gain Control, and Digital FFT and Logic In FIG. 5, a schematic view of an example of a receiver shows an analog part 500 and a digital part 565. In the analog part is an antenna feeding an analog front end 505. This can include the mixer and LO, adaptable to receive a different range of frequencies, or could incorporate other ways of adapting the range of frequencies. The front end feeds a tunable BRF 510. The front end typically has a bandpass filter for anti aliasing, and the BRF can be implemented as part of this circuit. This feeds a gain control part 520. The output of this is fed to the ADC 340. The BRF optionally has a bypass path so that it is switched out during detection of the interference, and may stay switched out if no interference is detected. The ADC feeds digital signals to the digital part 565. This can include a power detector 525, coupled to provide a measure of maximum power to the gain control part. The digital part can also include a digital BRF (not shown), a part for decimation 530 to reduce the sample rate for the FFT part 535. This FFT part forms a spectral analyzer for use in the interference detector 130. Other logic 555 is used to process the resulting spectrum to detect the interference. Further logic 560 is used for determining mitigation of the in band and out of band interferences. This mitigation can involve feedback to tune the tunable BRF. The FFT can feed the digital baseband part 540, or the FFT can be bypassed so the digital baseband has access to the time domain information, for deriving the useful signal.

FIG. 6, Steps in Operating a Wireless Receiver to Improve Gain Control

In FIG. 6 steps in operating a wireless receiver according to an embodiment are shown, including mitigating by tuning a BRF. Out of band interference is detected at step 240. At step 575 it is determined whether the detected out of band interference is sufficient to influence the gain control. This can involve comparing the interference to a threshold, or comparing it to a maximum power detected in the band. At step 580, if needed, the out of band interference is suppressed by tuning the BRF according to the frequency of the out of band interference. Some power consumption can be saved if this is only done when needed. Then at step 585, gain control is carried out after the suppression, so that the gain control is not influenced by the out of band interference.

FIG. 7 Schematic View of Receiver Circuitry having FFT and NBI Estimation Parts FIG. 7 shows an embodiment in which an analog part 500 feeds a signal to ADC 340. The digital output is sampled at 1 Gsps in this example and fed to the spectrum analyzer 530 (having a 128 point FFT) without downsampling. This can give a frequency domain output over a bandwidth of 1056 MHz and with a resolution of 8.25 MHz. Every alternate set of 128 samples is discarded, to avoid the speed of processing in the FFT having to be raised. The output at 528 Msps is fed to an NBI estimation part for further processing to determine where the interferers are in terms of frequency and how strong they are, from the frequency domain information. This can enable mitigation to be controlled for example by sending a BRF control signal back to the analog part. More details of a possible implementation of the NBI estimation part are explained below with reference to FIGS. 10 to 13. The 1 Gsps output of the ADC can also be used by the power detector 525. As before, it returns a signal to the analog part for use in gain control.

FIG. 8, Wireless Receiver having Analog BRF and Digital BRF and Synchronization FIG. 8 shows another embodiment similar to that of FIG. 5, but in this case, as in FIG. 7, the output of the ADC is fed to the interference detector without decimation. This enables a broader bandwidth for each of the different frequency ranges. If narrower ranges are used, it may be appropriate to have more of them to cover the particular band and the transition regions at either side of the particular band, where out of band interferers are not removed entirely by filters in the front end.

There is also a bypass path shown around the tunable BRF, for use in the time periods when there is interference detection, since the same front end, gain control and ADC are used for receiving the useful signal as are used for receiving the first and second frequency ranges used for interference detection. Again, the BRF may remain switched out while the useful signal is received if no interference is detected. FIG. 8 also shows further digital processing parts such as decimation filtering 530, digital BRF 590, and synchronization 592.

Figure 9:
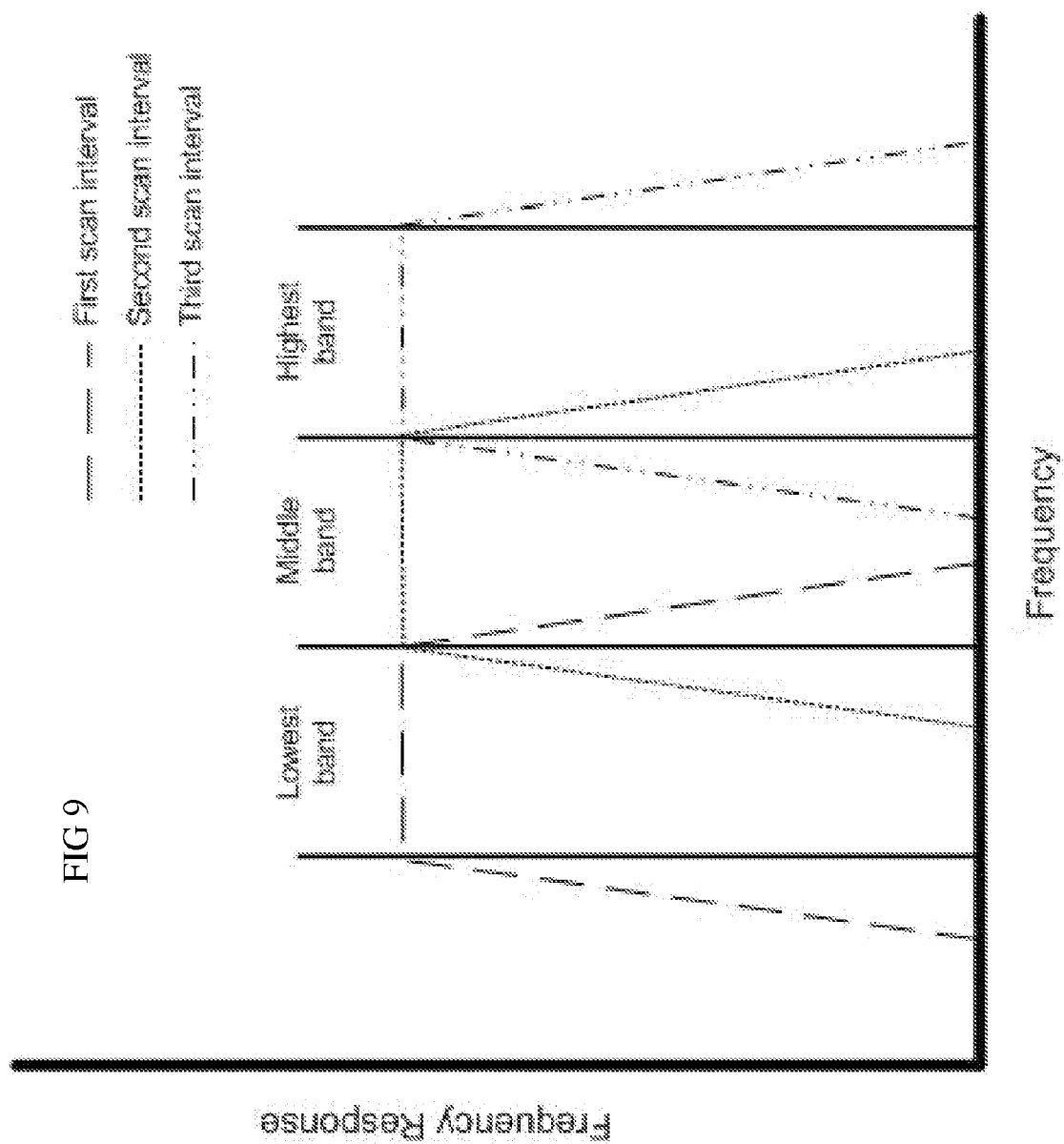
FIG. 9 shows a frequency response graph showing three frequency ranges according to an embodiment.

FIG. 9, Graph of Frequency Response Showing Three Frequency Ranges

This graph shows a representation of three frequency ranges used for detecting in band and out of band interference components. In this case, the particular band coincides with the middle band, so this middle band is an example of the first range, used for detecting in band components. The lowest and highest bands are on either side of this particular band and are adjacent to it. This means the transition regions above and below the particular band, where out of band interference components are not completely stopped by the front end, are covered by the lowest and highest band. These are examples of the second frequency range. In this example, the three bands are adjacent so that their pass regions do not overlap, but the pass region of one overlaps the entire transition region of its neighbour. Alternative embodiments can be envisaged having more but narrower regions, or with pass regions which overlap each other.

Figure 10:
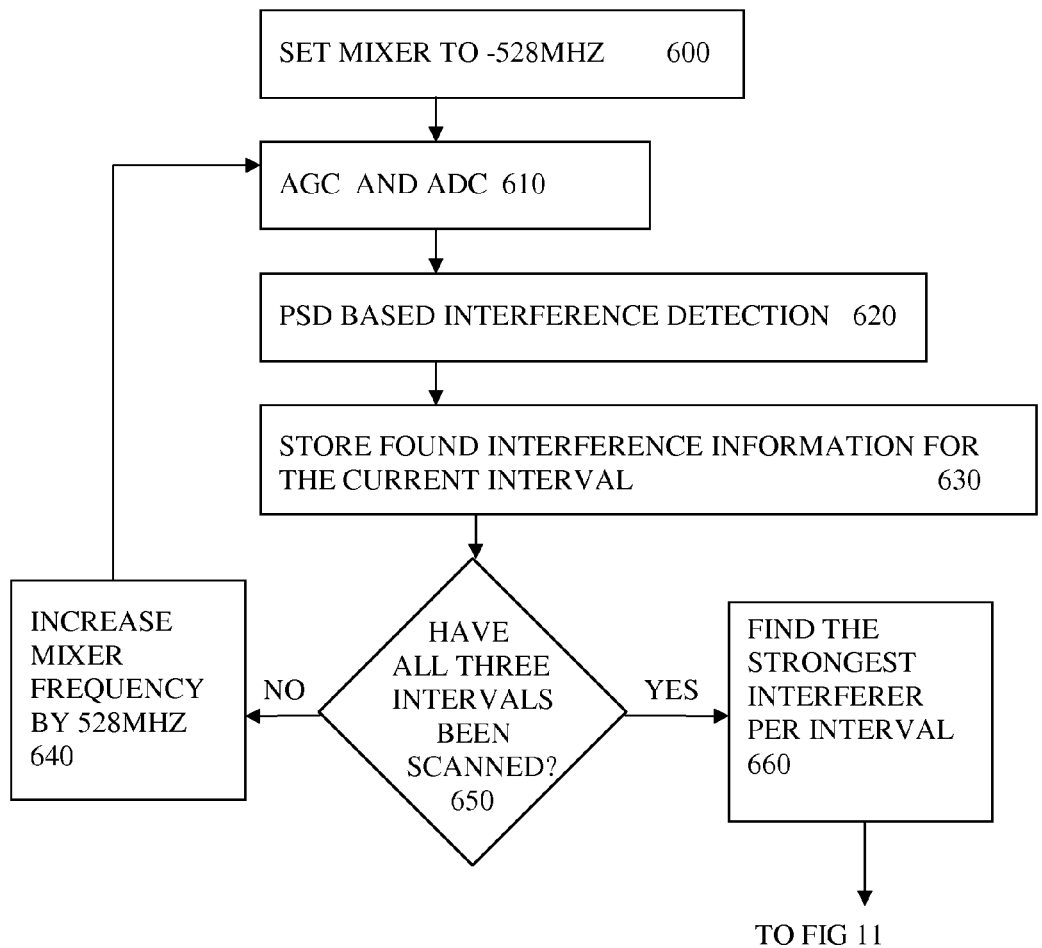
FIGS. 10 and 11 show steps in operating a wireless receiver according to an embodiment, involving detecting artifacts from interference detection in three frequency ranges.
Figure 11:
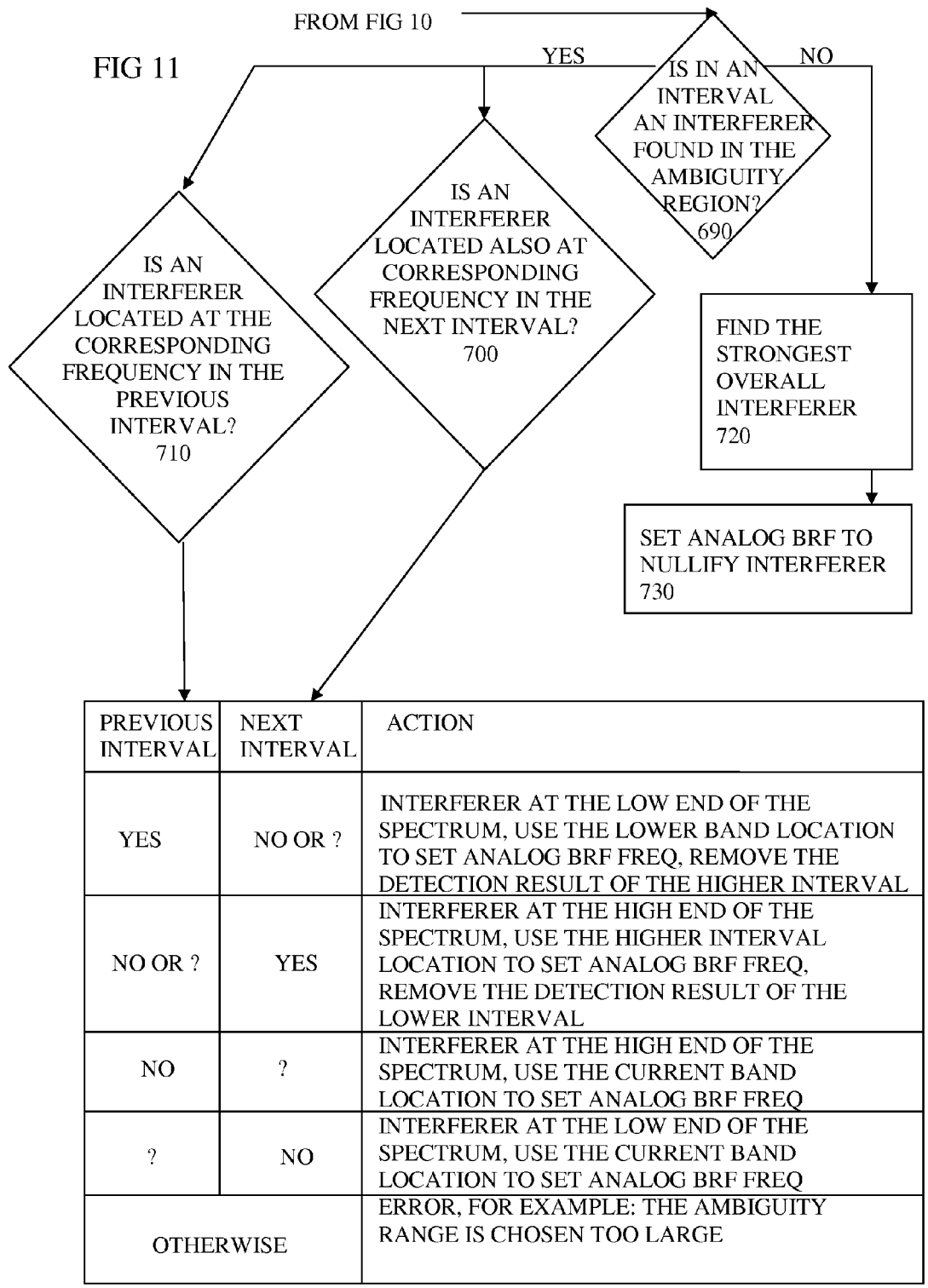

FIGS. 10, 11 Steps in Operating Involving Detecting Artifacts Using Three Frequency Ranges FIGS. 10 and 11 show a flow chart of steps in an example implementation involving detection of interference, deduction of artifacts, and determining a tuning frequency for a BRF. At step 600, the frequency range control part 150 sets the LO so that the mixer mixes down to −528 MHz. The gain is controlled at AGC step 610, and conversion to digital by the ADC is carried out. At step 620, PSD based (power spectral density) spectrum analysis is carried out. An example of how to carry out this is set out in more detail in FIG. 13. At step 630 the found interference information for the current interval or frequency range is stored. At step 650, this loop is controlled by asking if all three intervals or frequency ranges have been used for detecting interferers. If not, then at step 640, the mixer frequency is increased by 528 MHz, and steps 610 onwards are repeated. Otherwise, at step 660, from the stored information, the strongest interferer in each interval or frequency range is found.

Moving on to FIG. 11, at step 690, it is determined whether in any interval an interferer is found in an ambiguity region. This is a region near the edges of the particular band, where it is possible for the detected in band interferer to be an artifact. At step 720, if none are found, then the strongest interferer is identified and at step 730 the analog BRF is tuned to suppress the frequency of this interferer. The strength of the suppression and the bandwidth may be adjusted in some cases, as well as the centre frequency, to improve the suppression.

If instead there is an interferer found in the ambiguity region, then whether it is an artifact is resolved as follows. At step 700 it is determined whether there is an interferer located also at a corresponding frequency in the next interval at a higher frequency range, with a frequency spacing such that spectral wrapping could have caused the artifact. This frequency spacing depends on the sample rate. At step 710, the same step is carried out for the previous interval, at a lower frequency range.

Then the table of possible actions as shown in the figure is followed based on the outcome of steps 700 and 710. In the first line of the table, the action is taken if there is an interferer in the previous interval, and either none in the higher frequency interval, or there is no higher interval because the ambiguous interferer is in the highest interval, indicated by "?". The action is to deduce that the interferer is in the lower end of the spectrum, so the BRF is tuned to this and the detection result of the higher interval is regarded as an artifact and removed. There is always a possibility that in fact there are two real interferers at this particular frequency spacing, and this small risk can be accepted in this case, or possibly a subsequent interference detection procedure with the suppression in place could be carried out to verify that the artifact has been suppressed. In the second line of the table, action is taken if there is an interferer in the next higher frequency interval, but none in the lower, or where there is no lower interval, indicated by "?". The action is to deduce that the interferer is in the higher frequency interval, so the BRF is tuned to suppress this and the detection in the lower frequency interval is taken to be an artifact and removed.

The third and fourth lines of the table show the action to be taken if there is no interferer in the lower frequency interval and none in the higher frequency interval respectively, where there is no higher interval or no lower interval respectively. In these cases, it is taken that there is no artifact, that the interferer detected in the ambiguous region, is an actual interferer. Thus the BRF is tuned to suppress this frequency. A bottom row of the table shows the case for any other condition, and error is assumed, such as the ambiguity region being chosen to be too large.

Figure 12:
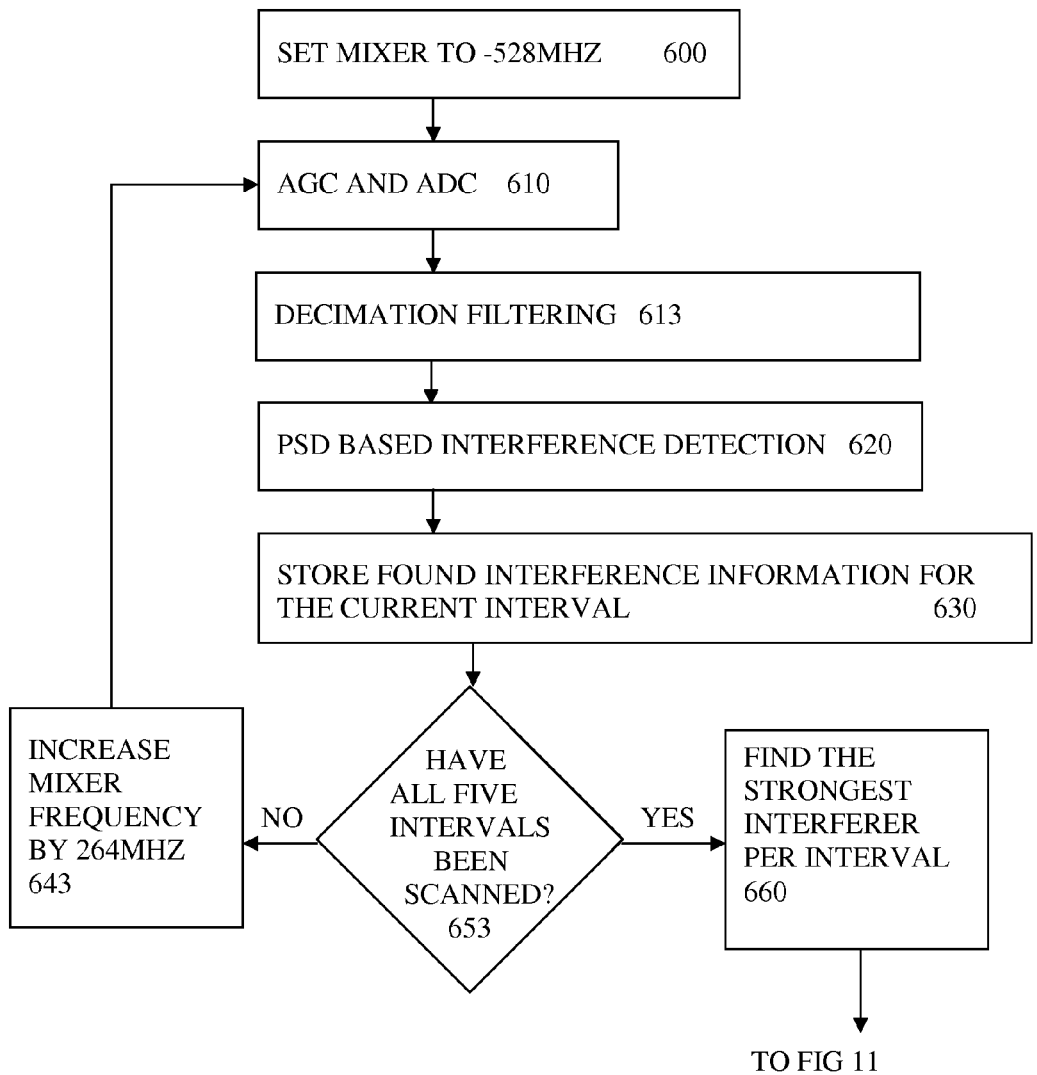
FIG. 12 shows steps similar to those of FIG. 10, according to an alternative embodiment involving detecting artifacts from interference detection in five frequency ranges.

FIG. 12 Alternative Embodiment Involving Detecting Artifacts Using Five Frequency Ranges FIG. 12 shows a flow chart similar to that of FIG. 10, but for an alternative embodiment in which decimation filtering is carried out at step 613 after the AGC and ADC, and the increase in mixer frequency is halved at step 643 to be 264 MHz rather than 528 MHz. The decimation by a factor of two means the effective sample rate is halved and so each frequency range has half the bandwidth, so in this case five such frequency ranges are used by changing the loop control step 650. The amount of overlap of the frequency ranges is adjusted by the change in increase of mixer frequency.

Figure 13:
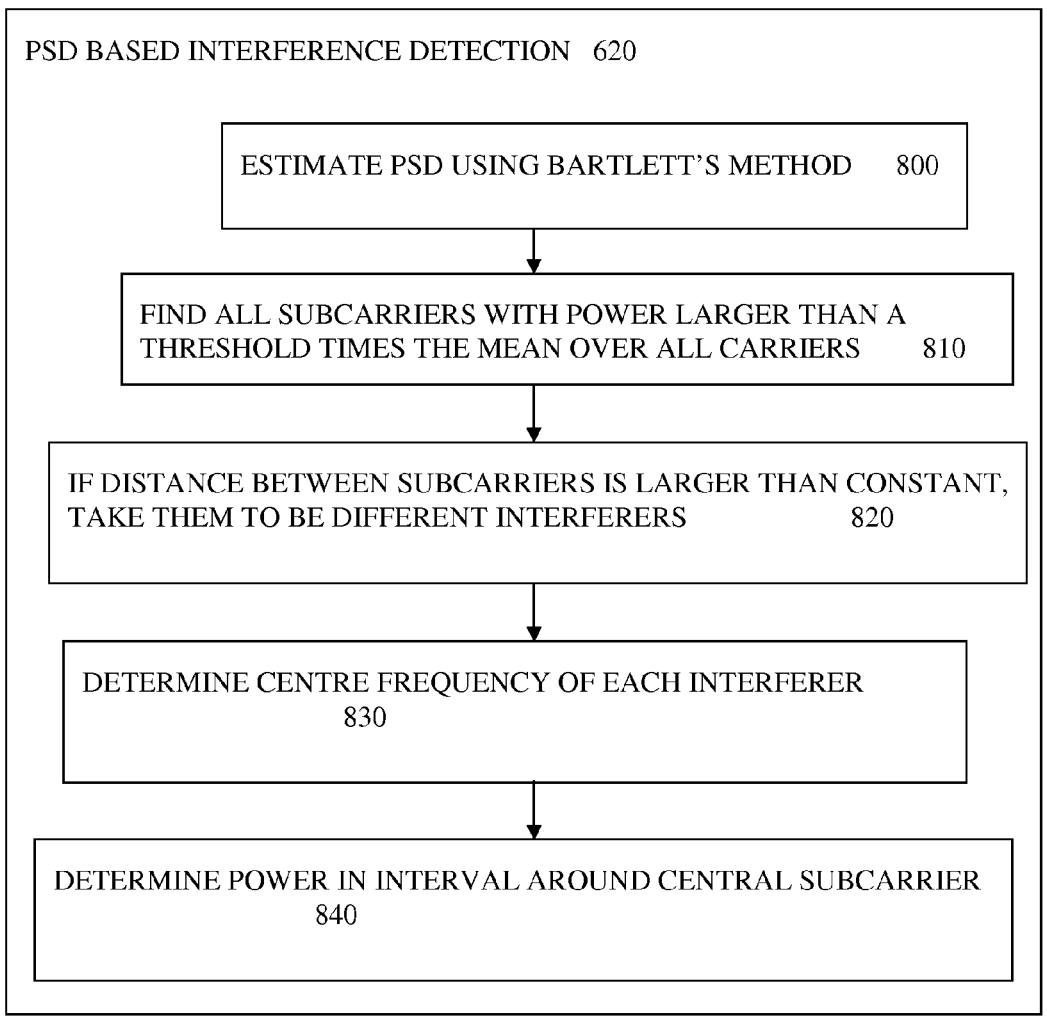
FIG. 13 shows steps involved in interference detection in the embodiments of FIG. 10 or 12, or other embodiments.

FIG. 13, Steps in Interference Detection in the Embodiments of FIG. 10 or 12, In FIG. 13, steps involved in an example of the interference detection of FIG. 10 or 12 are shown. Other examples could be envisaged. At step 800, the PSD is estimated from the FFT output using Bartlett's method. At step 810 all the subcarriers with a power larger than a threshold times the mean over all carriers are found. At step 820, if the distance in frequency between subcarriers over this power is larger than a constant, they are taken to be separate interferers. At step 830, a centre frequency of each interferer is determined. Then a power in the interval around the central subcarrier is determined at step 840.

Other Matters

Note that the analog BRF can not be switched (due to transients behavior of it capacitors) to different frequencies in the small interval between the OFDM symbols. Therefore it is only possible to set the analog filter to frequency for an entire band group. The digital BRF can be switched to a different frequency for every OFDM. So after the interference detection is completed for the entire band group, the outcome is at most one frequency for the analog BRF and at most three frequencies for the digital BRFs. The basic assumption here is that only one very strong interferer is present in the entire band group.

A band group has a bandwidth of 3*528=1584 MHz. The spectral location of the band is defined as: lowest band from −792 MHz to −264 MHz, the middle band −264 MHz to +264 MHz, the highest band +264 MHz to +792 MHz.

The approach of FIGS. 7, 8, 9 and 10 directly takes the output of the ADC to prevent any frequency wrapping due to down sampling of the decimation filter and will shift the down mixing frequency of the front-end in steps of 528 MHz. The approach of FIG. 5 and FIG. 12 takes the output of the decimation filter but uses the front-end option to shift the down mixing frequency of the front-end in steps of 528/2 MHz.

In the FIG. 7 approach, the output of the ADC is taken as the input for the interference detection. This overcomes any spectral wrapping due to the down sampling by a factor of two in the decimation filter. However spectral wrapping is still possible around 528 MHz due to sampling from analog domain to 2*528 MHz in the ADC. The attenuation of the anti-aliasing filtering at 528 MHz can be about 46 dB which is not enough to prevent spectral wrapping. Note that therefore any wrapping will occur around −528 MHz and +528 MHz from the mixing frequency. Due to the higher sample rate the width of a frequency bin is increased from 4.125 MHz to 8.25 MHz, giving a lower frequency detection resolution.

When frequency bins at the output of the FFT that have a power larger than the threshold are found, the maximum distance between subcarriers still belonging to one interferer, Nspan, can be set at 10 bins for example. The bin width of the subcarriers is 8.25 MHz, but the resolution at which the analog BRF can be set is 4.125 MHz. So when calculating the centre frequency a 0.5 bin step size is allowed. The centre frequency/bin is defined as the point, for which the sum of the distances to the centre frequency, from each of the bins within an interferer is minimized. If more points have the same minimum distance, then the one which has the minimum maximum distance for all the subcarriers is used. Note that this method is just one of the many possibilities to determine the centre frequency. This method is preferred over a sliding power window method. The reason for this is that detection quality is improved and the smearing effect of the window can make it harder to distinguish between closely spaced interferers. An alternative would be to take the weighed, with respect to power, centre of the subcarriers above the threshold.

To calculate the power in an interval around the centre frequency, the bandwidth of the BRF is used as a basis, so the power interval is chosen to be 8 subcarriers to the left and right in one example.

To determine if any of the central bins of the FFT output are in the ambiguity region, the following can be carried out. The attenuation of the anti-aliasing+decimation filters is determined. This can be for example 70 dB or more at 400 MHz from the centre frequency, which is 400−264=136 MHz from the wrapping frequency. Measured in bins, this is 136 MHz/ 4.125 MHz per bin=32.97 bins, so effectively=33 bins. This gives an ambiguity range of 33 bins either side of the pass region. The central bin of the interferer found in scan interval 1 is in the ambiguity range.

Comparison of FIGS. 10 and 12

Both approaches of FIGS. 10 and 12 are capable of detecting just-out-of-band interferers. Furthermore the frequency resolution in FIG. 12 is twice as large as in that of FIG. 10, leading to more accurate estimation of the spectral position of the interference. FIG. 10 on the other hand requires less scan intervals and thereby fewer PSD estimates, where most of the computational effort is. FIG. 10 has an advantage over FIG. 12 that relates to the fact that the AGC value is determined prior to decimation.

Uwb Examples

Two examples of ways to implement the out of band interference detection for UWB are as follows.

A first method is to combine the interference detection with the synchronization, here in conjunction with the normal synchronization operations the interference detection is performed on the spectrally flat synchronization sequence. In the first band the synchronization and interference detection starts, and once the OFDM symbol timing is recovered, the hopping to the other band can be done in order to fine tune the gains for those bands and to detect the interference there as well. If needed, the analog BRF will be engaged in the first band to be able to get to the recovery of the symbol timing. After all bands have been visited, the results of the interference can be combined and filters set accordingly.

A second method is to use an empty MAS (MAC allocation slot). This is a period of time in which there are no packets to be received. In this period the interference detection can be done for all bands, so the needed BRF filter settings are available when a new packet arrives.

As UWB involves hopping between neighbouring bands within a band group, an overall goal is to detect artifacts in any band caused by interferers in neighbouring bands in the group. Therefore a map of such interferers and artifacts can be built up in the course of visiting all the bands, regardless of the order in which they are visited.

Concluding Remarks

As has been described, a wireless receiver for UWB or other format, receives a useful signal in a particular band of frequencies in spite of interference components inside and outside the particular band of frequencies. An interference detector (130, 535, 555) detects the in band interference component in a first range of frequencies to include the particular band of frequencies. The same receiver circuitry (300, 310, 505) is adapted to receive a second range of frequencies to include frequencies adjacent to the particular band, to detect the out of band interference component. An influence of the out of band interference can be mitigated. By adapting the same receiver circuitry to receive different frequency ranges for the detection, costs of broadening the bandwidth of the receiver circuitry to detect the out of band interference can be avoided. Other variations can be envisaged within the scope of the claims.

The invention claimed is:

1. A method of operating a wireless receiver to receive a wanted signal, the method comprising the steps of:
   receiving a first signal comprising the wanted signal and any unwanted signals;
   downconverting the first signal to a first analog baseband signal using a first oscillator frequency;
   band pass filtering the first analog baseband signal to obtain a filtered first analog baseband signal;
   converting the filtered first analog baseband signal to a first digital baseband signal representing a frequency band including the wanted signal;
   identifying the position of any first interfering signal in the first filtered digital baseband signal;
   downconverting the first signal to a second analog baseband signal using a second oscillator frequency;
   band pass filtering the second analog baseband signal to obtain a filtered second analog baseband signal;
   converting the filtered second baseband signal to a second digital baseband signal representing a frequency band directly above or below that of the wanted signal;
   identifying the position of any second interfering signal in the second digital baseband signal;
   comparing the identified first and second interfering signals;
   determining the required frequency of a band reject filter based on the comparison;
   filtering the first analog baseband signal using the band reject filter at the determined frequency; and
   obtaining the wanted signal from the first filtered digital baseband signal.

2. The method of claim 1 wherein comparing the identified first and second interfering signals comprises comparing the positions of the first and second interfering signals in their respective digital baseband signals and determining whether they occupy similar positions in their respective bands.

3. The method of claim 2 wherein if the interfering signals occupy similar positions in their respective bands, further determining whether the positions are in an ambiguity region close to the edge of the bands.

4. The method of claim 3 wherein if the interfering signals are in the ambiguity region, determining the required frequency of a band reject filter comprises determining that the required frequency of the band reject filter is that of the interfering signal found in the second digital baseband signal.

5. The method of claim 3 wherein if the interfering signals are not in the ambiguity region, determining the required frequency of a band reject filter comprises determining that the required frequency of the band reject filter is that of the interfering signal found in the first digital baseband signal.

6. The method of claim 3 wherein the ambiguity region is where artifacts can appear caused by spectral folding of interfering signals from other frequencies.

7. The method of claim 2 wherein if the inferring signals do not occupy similar positions in their respective bands, determining the required frequency of a band reject filter comprises determining that the required frequency of the band reject filter is that of the interfering signal found in the first digital baseband signal.

8. The method of claim 1, wherein the useful signal is an Ultra Wide Band signal.

9. A wireless receiver comprising:
   an input for receiving a wanted analog signal;
   a mixer for downconverting the analog signal to first and second analog baseband signals using a tunable oscillator set at first and second frequencies;
   a band pass filter for selecting a respective band of frequencies from the first and second analog baseband signals, the first band representing a frequency range of the wanted signal and the second band representing a frequency range directly below or above that of the first band;
   an analog to digital converter to convert the first and second analog baseband signals to first and second digital baseband signals comprising bands representing the corresponding bands of frequencies;

an interference detector;
an analog band reject filter; and
a processor adapted to
- identify and compare any interfering signals in the first and second digital baseband signals and
- control the frequency of the band reject filter in response to the comparison of the interfering signals.

10. The wireless receiver of claim 9 further comprising:
a decimation filter; and
wherein the interference detector comprises an FFT and a spectral analyzer arranged to determine frequencies of peaks.

11. The receiver of claim 9, wherein the processor is further adapted to determine whether the interfering signals occupy similar positions in their respective bands.

12. The receiver of claim 11, wherein the processor is further adapted to determine whether the positions of the interfering signals are in an ambiguity region close to the edge of their bands.

13. The receiver of claim 12, wherein the processor is further adapted to determine the frequency of the interfering signal found in the second digital baseband signal if the interfering signals are in the ambiguity region and occupy similar positions in their respective bands.

* * * * *